United States Patent
De Dinechin et al.

(10) Patent No.: US 8,694,819 B2
(45) Date of Patent: Apr. 8, 2014

(54) SYSTEM AND METHOD FOR GRADUALLY ADJUSTING A VIRTUAL INTERVAL TIMER COUNTER VALUE TO COMPENSATE THE DIVERGENCE OF A PHYSICAL INTERVAL TIMER COUNTER VALUE AND THE VIRTUAL INTERVAL TIMER COUNTER VALUE

(75) Inventors: Christophe De Dinechin, Valbonne (FR); Karen Lee Noel, Pembroke, NH (US); Jonathan Ross, Woodinville, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 866 days.

(21) Appl. No.: 12/461,774

(22) Filed: Aug. 24, 2009

(65) Prior Publication Data
US 2011/0047315 A1    Feb. 24, 2011

(51) Int. Cl.
*G06F 1/00*    (2006.01)
(52) U.S. Cl.
USPC ........................................................ 713/500
(58) Field of Classification Search
USPC ........................................................ 713/500
See application file for complete search history.

(56) References Cited

U.S. PATENT DOCUMENTS

| | | | |
|---|---|---|---|
| 5,678,019 A | 10/1997 | Podkowa et al. | |
| 6,134,187 A | 10/2000 | Tomiyasu | |
| 7,102,391 B1 | 9/2006 | Sun et al. | |
| 7,500,130 B2 | 3/2009 | Brokish | |
| 7,849,347 B2 * | 12/2010 | Armstrong et al. | 713/500 |
| 2003/0233479 A1 | 12/2003 | Keohane et al. | |
| 2004/0190378 A1 | 9/2004 | Farmer | |
| 2006/0133426 A1 * | 6/2006 | Craddock et al. | 370/503 |
| 2007/0234070 A1 * | 10/2007 | Horning et al. | 713/190 |
| 2010/0251235 A1 * | 9/2010 | Ganguly et al. | 718/1 |

OTHER PUBLICATIONS

DP8573A Real Time Clock (RTC), 1995 National Semiconductor Corporation, May 1993.
VMware, Timekeeping in VMware Virtual Machines, 1998-2005.

* cited by examiner

*Primary Examiner* — Thomas Lee
*Assistant Examiner* — Xuxing Chen (57) ABSTRACT

A system and corresponding method virtualizes a real-time clock in the presence of a time-disrupting event. The real-time clock is used with physical machines and includes a single time source within each of the physical machines. The system is implemented in one or more programmable devices, which may be hardware and/or software devices, or a combination of hardware and software devices. The physical machines include one or more virtual machines. The system includes an offset module that determines a time difference offset between a virtual interrupt timer counter ($ITC_V$) associated with a virtual machine and a physical interrupt timer counter ($ITC_P$) associated with a physical machine. The system also includes a virtual machine monitor that computes one or more first time adjustments based on the offset and applies the adjustments to eliminate at least a first part of the offset.

25 Claims, 7 Drawing Sheets

SYSTEM AND METHOD FOR GRADUALLY ADJUSTING A VIRTUAL INTERVAL TIMER COUNTER VALUE TO COMPENSATE THE DIVERGENCE OF A PHYSICAL INTERVAL TIMER COUNTER VALUE AND THE VIRTUAL INTERVAL TIMER COUNTER VALUE

BACKGROUND

A computer uses time sources to control and regulate operations, and a computer's operating system, typically, is programmed to interface with these time sources to track time and schedule periodic events. To track time, the operating system may increment current time (also called wall-clock or absolute time) when a periodic timer interrupt is received. Such periodic timer interrupts often are referred to as ticks, and this method of time keeping is known as tick counting. The wall-clock time then may be maintained by a real-time clock, such as a hardware time register. Computers commonly use multiple such registers: a battery-backed clock (register) to maintain time (in seconds, minutes, hours, date) even when the computer is powered off; and another clock to provide higher resolution time when the computer is powered on. At boot up, the operating system reads the wall-clock time stored in the battery-backed clock and uses that information to determine the current wall-clock time. Subsequently, some operating systems may use only the register with higher time resolution.

Maintaining a real-time clock using a high-resolution register works well as long as the register remains a credible time source. By definition, a time source is credible if an operating system or application cannot notice inconsistencies (e.g., time running backwards or moving forward by an unacceptably large amount). A time-disrupting event causes the passage of time to present such time-related inconsistencies in the context of operation of a virtual machine. In contrast, high-resolution time sources for physical machine implementations typically are guaranteed to remain credible at all times.

Virtual machines are logical implementations of a predefined computer architecture. A virtual machine is capable of executing software (applications and operating systems) designed for the predefined computer architecture, although the method of implementation in the virtual machine may be entirely different from that in the physical machine. Common implementations of virtual machines include software or hardware emulating the original computer architecture. Software executing in a "guest" or virtual machine is generally called "guest software" (for example, "guest operating system"). By contrast, the physical machine containing the virtual machine is generally called the "host," and may be running its own "host software" (for example, "host operating system").

A common operating scenario involving virtual machines is called "on-line migration," where a virtual machine running on one host is sent to another host, without, except for perhaps a brief suspension period, interrupting the software or operating system running in the virtual machine. The host on which the virtual machine originally executed is called the "original host." The host on which the virtual machine ran before the migration is called the "source" of the migration, whereas the host where the virtual machine resides after migration is called the "target." Note that the source may or may not be the original host. During part of the period of the migration, execution of the virtual machine may be suspended, or "frozen," to be "thawed" after the migration. The amount of time during which the virtual machine is frozen, i.e. not executing, is called "missing time."

In the on-line migration scenario, time disruption occurs when time sources on the first physical machine (i.e., the original host) do not match those on the target physical machine. Time values reported by these time sources to a guest might leap forward or backward, or might be measured using different frequencies. Additionally, since the guest operation may be "frozen" for a time as it is being migrated, upon "thawing" at the target, the guest operation would detect a sudden leap forward of time. Such a time disruption or discontinuity may trigger time-out detection code in the guest operation, which in turn could cause a variety of software errors or aborts.

DESCRIPTION OF THE DRAWINGS

The detailed description will refer to the following drawings in which like numerals refer to like items, and in which.

DETAILED DESCRIPTION

Some computer architectures (i.e., physical machines) are implemented with multiple independent time sources for measuring current time and date (wall-clock time), measuring time intervals (interval timer), and generating time-based interrupts (timer interrupts). Such computer architectures may have, for example, two time bases. One time base applies to timer events, for example to schedule operations in the computer architecture. The other time base supplies wall-clock time. In computer architectures having two or more independent time sources, time disrupting events may be handled by "freezing" one time base while the other continues. For example, to enable on-line migration from a source host to a target host, the interval time and timer interrupt generation may be "frozen," while the wall clock keeps moving forward. Since the interval timer and timer interrupts are frozen, guest software typically will not detect timeouts and will not overload trying to process a large number of postponed interrupts. If the wall clock advances at the same rate on the different physical machines, wall-clock time is by definition consistent between the physical machines, and can be re-synchronized after the migration by moving the wall-clock time forward by approximately the migration time.

Other computer architectures are implemented using a single time source. When a time-disrupting event, such as migrating a virtual machine, occurs, the wall-clock time necessarily also is frozen, leading to discontinuities in wall-clock time. To allow correct execution of the migrated virtual machine, these discontinuities must be corrected or compensated. Disclosed herein is a system, and a corresponding method, for efficient correction of a time-disrupting event by virtualization of a real-time clock. The system and method will be described with respect to a single time source (referred to hereafter as an interval timer counter (ITC)) instantiated on a computer architecture. However, the system and method may be extended to any system that presents a real-time clock, and to any other system consuming that real-time clock that needs to be shielded from time-disrupting events.

Also note that in a computer architecture having multiple processors (CPUs), each processor will have its own physical ITC. The values of these multiple ITC should not be allowed to diverge by too great a value. As will be described later, the disclosed system and method operate to retain the ITC values within an acceptable range relative to each other.

The disclosed system and method allow progressive correction of wall-clock time while minimizing the effects on the consumer (e.g., the virtual machine) of the correction, and further allows the real-time clock to ultimately return to the value it had prior to the time-disrupting event. In an embodiment, the system and method allow guest operating systems to run without timing-out on sensitive operations, and to progressively synchronize with the target ITC, ultimately allowing de-virtualization of the real-time clock.

Figure 1:
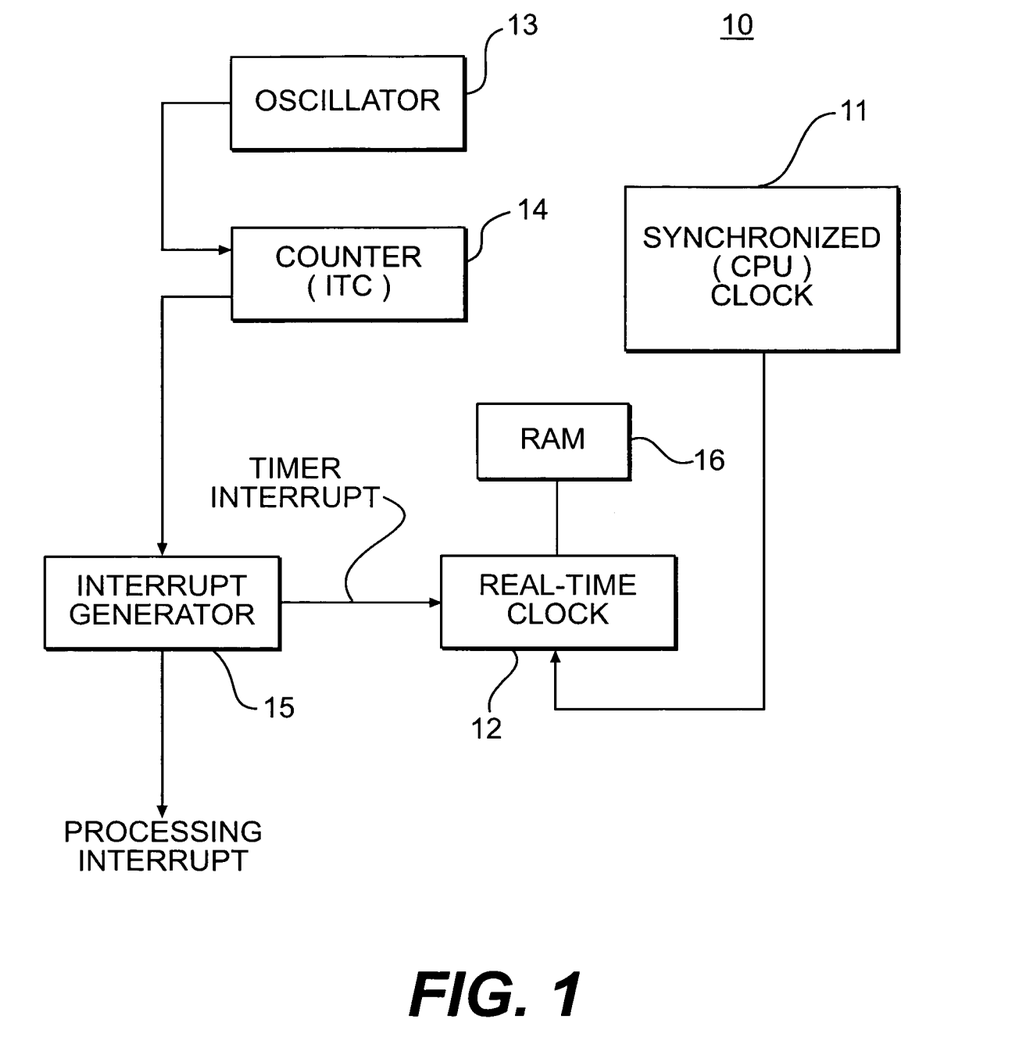
FIG. 1 is a block diagram of an exemplary real-time clock and interrupt module (RCIM)

FIG. 1 is a block diagram of an exemplary real-time clock and interrupt module (RCIM) 10 that supports virtualization and de-virtualization of a real-time clock. In FIG. 1, RCIM 10 includes one or more synchronized clocks 11 (for CPU timing), one or more real-time clocks 12, an oscillator (e.g., a crystal oscillator) 13, an ITC 14, an interrupt generator 15, and a memory (RAM) 16, connected as shown. The oscillator 13 provides a fixed input frequency to the ITC 14, which counts one unit for each cycle of the oscillator 13. The ITC 14 provides an input to the real-time clock 12 and the interrupt generator 15. When the ITC 14 counts to a point set by the operating system, the ITC 14 signals the interrupt generator 15, which then may generate a timer interrupt to the real-time clock 12. The real-time clock runs 12 continuously, and is maintained close to the "correct" date and time by operation of the ITC 14.

The RCIM 10 provides wall-clock time, high resolution interval measurements, and timer and processing interrupt generation. Freezing the RCIM 10 leads to discontinuities in wall-clock time. A timer calibration service provided by the physical machine (see FIG. 2) makes it possible to determine how many steps (ticks) the ITC 14 counts every second, and consequently how many ticks occurred but were not applied during the "freeze."

To adjust wall-clock time, following a time-disrupting event, the "frozen" ticks can be replayed, but the guest operating system may time out if the ticks are replayed too quickly. For example, an operating system may require that an operation requested from an external device completes in less than a specified amount of time. If measured time leaps forward, the operating system will determine, incorrectly, that the device did not respond, and abort the operation. In some cases, such aborts interrupt the execution of the operating system entirely.

Problems may occur even if the operating system itself does not check for timeouts. Operating systems generally use timer interrupts to schedule processes (time sharing). If the ticks are replayed too quickly, an application may not have enough processor time to sufficiently execute its scheduled operations. For example, if the operating system is programmed to switch from one application to another every ten milliseconds, but the ticks are being replayed at a rate much faster than during normal execution, switching instead occurs every few microseconds. In this situation, the now extremely short periods of execution time between switching are not sufficient to allow the applications to complete their scheduled work. The applications themselves would then note the non-completion condition, and may abort execution or otherwise behave incorrectly.

Figure 2:
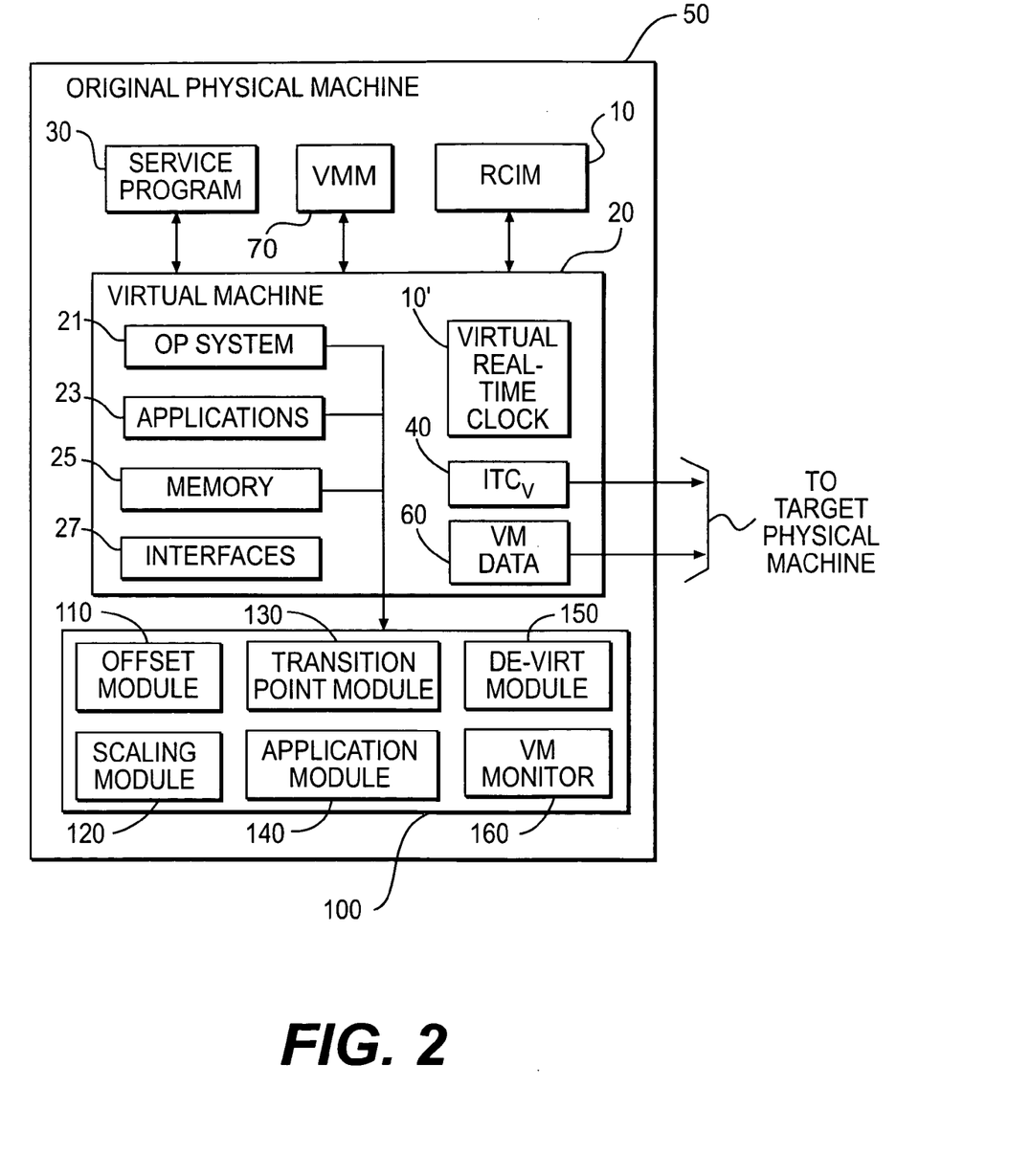
FIG. 2 is a block diagram of an exemplary system that implements virtualization of a real-time clock.

To eliminate these and other related problems, a real-time clock virtualization system 100, an exemplary embodiment of which is shown in block diagram form in FIG. 2, is disclosed. The real-time clock virtualization system 100 allows replaying ticks at a speed that permits a virtual real-time clock to catch up quickly with wall-clock time while avoiding triggering timeouts and subsequent aborts. The real-time clock virtualization system 100 is installed on a physical machine 50 on which a virtual machine 20 may execute. Also installed on the physical machine 50 is RCIM 10, a time calibration service 30, and an optional virtual machine monitor 70. The time calibration service 30 also may be included as part of the RCIM 10, in lieu of being a separate device (hardware or software program) as shown. The virtual machine 20 may include a guest operating system and/or one or more specific applications.

When a time-disrupting event occurs on the physical machine 50, the real-time clock virtualization system 100, in conjunction with the RCIM 10 and the time calibration service 30, operates to create a virtual real-time clock 10' with its own virtual ITC value 40. The virtual ITC value 40 then is used to adjust the real-time clock of the RCIM 10. Note that the time-adjusted RCIM may be the RCIM 10 on the original physical machine 50, an RCIM on a target physical machine, or a virtual implementation of a RCIM. Also note that the time adjustment may be implemented in hardware in the physical machine 50, separately or as part of the time calibration service 30, or as a computation performed in software in the virtual machine 20 or on the physical machine 50 but separate from the virtual machine 20.

The virtual machine 20 may be an isolated software module that includes its own operating system 21, applications 23, virtual memory (e.g., RAM) 25 and virtual interfaces (e.g., a network interface card) 27. The virtual machine 20 operates just like a physical machine to software executing in it, but is composed of components, such as software components or device emulation hardware, that may be entirely different from the physical machine components. The virtual machine 20 is subject to time disrupting events that may affect its performance, including aborting execution. If the physical machine 50 on which the virtual machine 20 is executing fails in some respect, or for a variety of other reasons, the virtual machine 20 may be migrated to another physical machine. Such a migration is itself a time-disrupting event, and may cause the virtual machine's operating system and/or applications to abort execution, unless the time-disrupting event is correctly compensated.

The real-time clock virtualization system 100 includes an offset module 110 that computes offset values that define a difference between time of origin of two physical machines plus the value of time associated with a time-interrupting event; a scaling module 120 that defines a ratio of frequencies between an original physical machine and a target physical machine; a transition point module 130 that determines appropriate operating transition points at which adjustments to the offset may be applied; an application module 140 that applies the adjustments to offset and the scaling factor, as appropriate; a de-virtualization module 150 that determines if the conditions exist to de-virtualize a virtualized real-time clock; and a virtual machine monitor 160 that monitors the virtual machine 20 and controls operations of the components of the system 100. Note that some functions of the virtual machine monitor 160 may be performed instead, by virtual machine monitor 70. In addition, the functions of the system 100 may be provided as software, programmed hardware, or a combination of software and programmed hardware. Finally, the arrangement shown in FIG. 2 of components of the system 100 may be changed without affecting the overall operation of the system 100.

Figure 3:
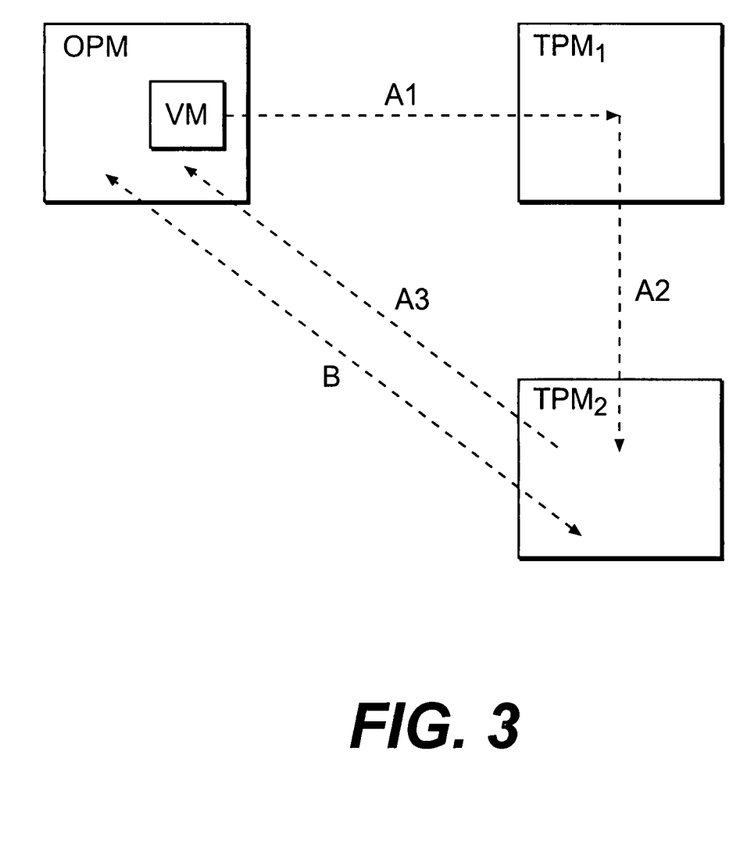
FIG. 3 illustrates time-disrupting events controllable by the system of FIG. 2.

FIG. 3 illustrates possible migration scenarios that are controllable by the system 100. In FIG. 3, virtual machine VM originally executes on original physical machine (OPM). For any number of reasons, the virtual machine VM is migrated to one or more other physical machines. Following migration paths A1 and A2, the virtual machine VM ultimately migrates to a second target physical machine (TPM2), after first migrating to a first target physical machine (TPM1). Subsequent to the migration to TPM2, the virtual machine VM may migrate back to the OPM along migration path A3. Alternatively, the virtual machine VM may migrate to the TPM2 directly along migration path B and remain at the TPM2. Many other migration possibilities exist. Each specific migration (e.g., TM1 to TPM2) potentially brings with it a need to correct wall-clock time among the ITCs of the OPM and the TPM, and the virtual ITC. This time difference includes missing time, differences in time origin between the OPM and the TPM, and any other lost time attendant with the migration. One example of such lost time is the time required to transfer data from the OPM to the TPM incident to the migration.

Returning to FIG. 2, as part of the migration process, certain data 60, arranged for example in packets, is sent from the physical machine 50 to the target physical machine. The information exchanged includes the operating frequency of the physical machine 50, the virtual ITC 40 of the virtual machine 20, the wall-clock time at which the virtual machine 20 is suspended, the physical ITC of the physical machine 50, and other data to ensure compatibility of the virtual machine 20 and the target physical machine. The exchange of information by data packets also includes data transfer from the target physical machine back to the physical machine 50. For example, once the virtual machine 20 has arrived at the target physical machine, the target physical machine sends a data packet back to the physical machine 50 with the arrival data, and the physical machine 50 computes the ITC value 40 of the virtual machine 20 and forwards this data to the target physical machine. This process of data exchange may introduce slight time errors, particularly since data packet travel times may not be known or accounted for in the migration process. As will be discussed later, this travel time may be compensated for by components of the system 100.

Of course, any migration to another physical machine brings with it potential complications regarding time measurements performed by the guest (e.g., the virtual machine 20). For example, the original physical machine 50 and the target physical machine may operate at different frequencies, so that without compensation guest time may appear to run too fast or too slow; the two physical machines may use a different time origin for their ITCs, so that the time may appear to jump by a large amount forward or backward; and there may be a large amount of missing time during which the virtual machine 20 did not actually run, so that there is a difference (i.e., the missing time) between the amount of time the guest ran and the amount by which wall-clock time moved forward.

To compensate for time-disrupting events, the real-time clock virtualization system 100, alone or in cooperation with other elements, creates the virtual ITC value 40. However, this virtualization of the real-time clock (i.e., creating the virtual ITC 40) adds varying amounts of overhead in the form of extra processing time, which translates into a reduction in overall processor performance. More specifically, a virtual machine executing on a host may attempt to access certain host components, but such accesses may not be desired (and hence are not allowed). One state of the art technique to implement such access restriction is called "trap and emulate." The host's virtual machine manager intervenes whenever the guest attempts to do something that either conflicts with what another operating system is attempting to do, or when the guest's access attempt exceeds its privilege level. The host's virtual machine monitor is programmed with numerous conditions under which the actions attempted by the guest should be "trapped," allowing the host to seize control and take alternative actions. In an implementation of the virtual ITC process, access to the physical ITC while the ITC is virtualized may create a conflict, and when attempted by the virtual machine 20, a processor will intercept a fault caused by the attempted guest access to the physical ITC. The processor then will execute an emulation routine that computes the value of the virtual ITC 40; the processor then resumes guest execution. In a computer system, a guest may need to access the physical ITC between a few thousand times and a few million times per second depending on the application. Even with aggressive optimizations, a trap-emulate cycle can consume around 2.5 percent of the total time spent executing the virtual machine. The system 100 thus is designed to "de-virtualize" the virtual ITC 40, which means the guest will be allowed to read the physical ITC directly without the need to trap and emulate. By contrast, a hardware implementation of the ITC virtualization technique disclosed herein would not suffer from this performance problem, and thus de-virtualization would not be needed.

The virtual ITC value 40 is adjusted using a scaling factor (SF) and an offset (O). The scaling factor (SF) is a ratio of the ITC ticks per second on the original physical machine (OPM) divided by the ITC ticks per second on the target physical machine TPM. When multiple on-line migrations occur back-to-back, the OPM may not be the physical machine on which the last migration was initiated. In fact, the OPM may be the physical machine to which the virtual machine currently is migrating in which case the scaling factor (SF) is guaranteed to be identical or close to 1 (one) (e.g., 1.00 plus or minus 0.001).

The offset (O) is computed so that the virtual ITC value ($ITC_T$) on the TPM immediately after the migration will be identical to the current value ($ITC_V$) for the virtual ITC on the current physical machine (CPM) immediately before the migration.

Using these concepts of scaling factor (SF) and offset (O), the ITC values of the virtual machine 20 ($ITC_V$) and the target physical machine ($ITC_T$) can be related according to:

$$ITC_V = (ITC_T \times SF) + O, \text{ where}$$

SF=$freq_V$/$freq_T$, and

O=time origin differential−missing time.

Since the virtual ITC is frozen at a past value, the wall-clock time will be early relative to the original physical machine by an approximation of the duration of the time-disrupting event or operation. The amount of missing time is computed or estimated as the difference between the virtual ITC value after the migration and the virtual ITC value before the migration. This amount of missing time then may be a component of the offset (O).

The origin of time for the ITC values may not be identical. Specifically, the wall-clock time corresponding to an ITC value of 0 generally is different between or among physical machines involved in the on-line migration of the virtual machine 20. In an embodiment, the value ($ITC_P$) of the physical ITC is set to zero when a particular host powers up, so that the origin of time is the time the physical machine was powered up. When the power-up times between two physical machines are identical, or very close to each other, it may be possible to eliminate the offset (O) in order to de-virtualize the virtual ITC. A common occurrence with this scenario is a virtual machine migrating back to its original physical machine, in which case the time origin differential is zero (unless the original host was re-started since the virtual machine last ran on it).

The time adjustments to the virtual ITC 40 may be made at selected transition points during operation of the virtual machine 20 on the target physical machine. In an embodiment, the transition points are operations that interrupt the normal flow of control of the virtual machine 20, such as virtual interruptions. The virtual machine 20 being interrupted cannot operate under the assumption that time after the interruption follows immediately after the time before the interruption, since the interruption gives control to the operating system in the virtual machine 20 for an unspecified amount of time. That is, the time gap associated with the interruption cannot be quantified accurately. Conversely, the operating system cannot assume much about the time at which the operating system is given control by an arbitrary interruption, since interruptions typically are the result of asynchronous events (events external to the processor). One example of such a transition point is when a timer interrupt issues, which suspends any executing applications. At the point of suspension there is no guarantee that time will not move forward by some relatively large amount (i.e., greater than a few milliseconds). Thus, the operating system will not notice the addition of a few extra milliseconds to the suspension period. If the suspension period is 10 milliseconds, the system 100 can add 1 millisecond or more to the virtual ITC value without affecting the guest operating system. In this way, the virtual ITC value is returned to the physical ITC value of the OPM. Therefore, time can skip slightly forward without any component of the virtual machine 20 being allowed to care about the forward skip. Because these time gaps are not quantified, the amount by which the virtual ITC is increased (time moved forward) may be computed to be a configurable fraction of the operating system's time slice interval. For example, in a physical machine with a time slice interval of 10 ms, if the fraction is set to 10 percent, each adjustment will move the virtual ITC value forward by 1 ms immediately before the guest is notified of a timer interrupt.

Once the missing time portion of the offset has been added, and if the scaling factor (SF) is close enough to 1.0 to make de-virtualization viable, and if the remaining offset (O) is small enough, then an additional step eliminates the remaining offset iteratively to de-virtualize the virtual ITC. This remaining offset elimination step uses the same transition points as for the missing time elimination step. There are, however, two differences. First, the amount by which the virtual ITC value is adjusted now can be positive or negative, and special care is needed so that the virtual ITC does not move backward in time. Second, the adjustment will make the wall-clock time as seen at the target physical machine diverge from the ideal or actual wall-clock time, instead of converging. As a result, an additional mechanism may be provided in the virtual machine to ensure that wall-clock time accuracy is preserved. State of the art mechanisms such as network time protocols (NTP) may be used at that stage to correct for the remaining error in wall-clock time.

The observable effect of these adjustments is that, if the time-disrupting operation interrupted execution for one minute, wall-clock time will appear to be early by one minute, and then will slowly catch up with the original wall-clock time. When this is done, a first phase (Phase 1) of the virtual ITC time adjustment ends. However, if the scaling factor (SF) is very close to one (1), and if the difference between the virtual ITC value and the physical ITC value is small enough, then the wall-clock time can be adjusted again (Phase 2), this time with the objective to de-virtualize the ITC. The adjustment rate for Phase 2 is chosen to be much slower than for Phase 1, allowing external mechanisms such as network time protocols to detect the effects of the adjustments and to compensate for them.

Note that the time-disrupting event does not need to be an on-line migration. In an embodiment of the system 100, the same virtualization mechanism is used for an unsuccessful on-line migration where the time disrupting event is the need to abort the migration. In another embodiment of the system 100, the same virtualization mechanism is used to adjust time after a virtual machine execution has been suspended and later resumed.

Figure 4:
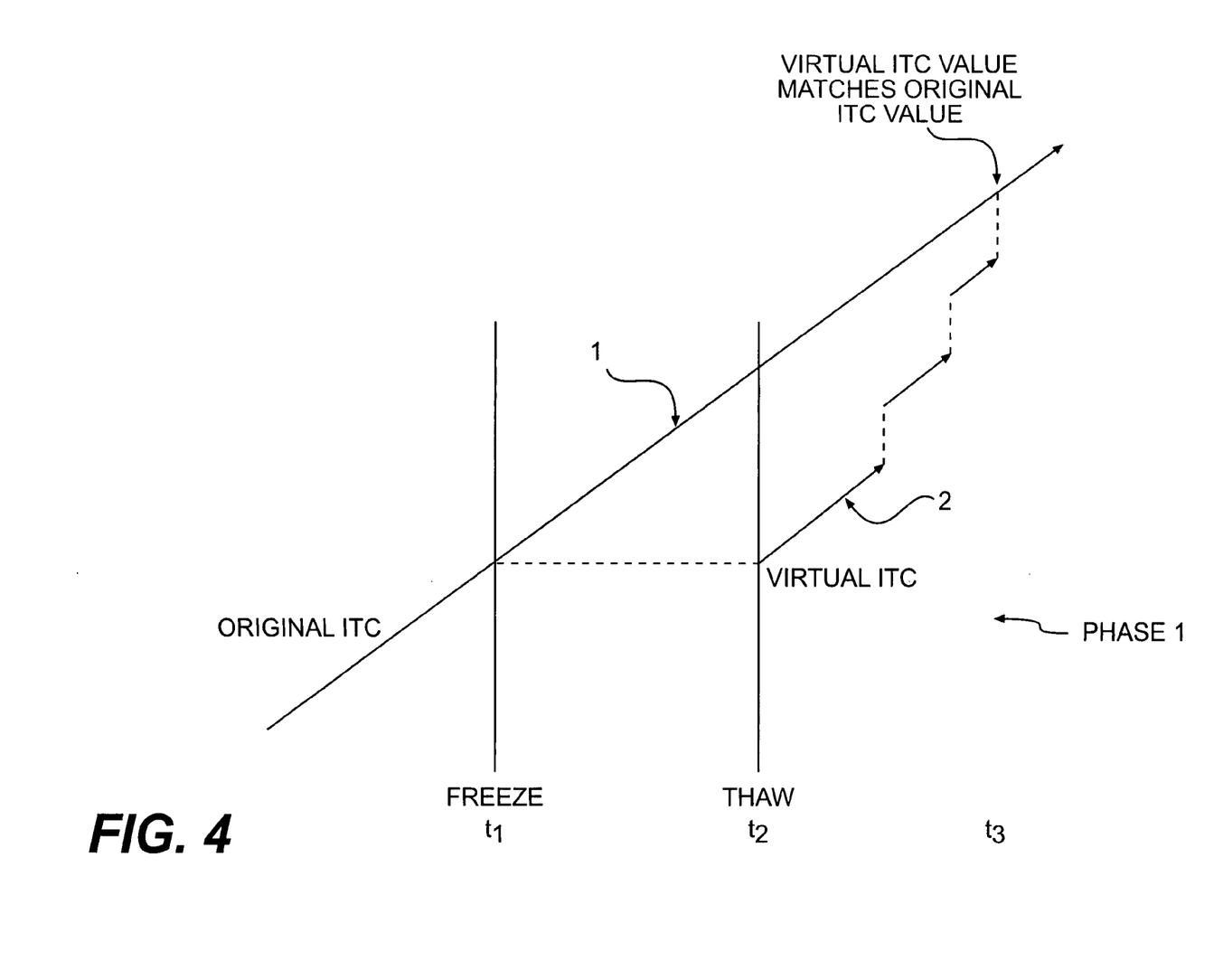
FIG. 4 is a time chart illustrating an exemplary time correction using the system of FIG. 2.

As noted above, if the virtual machine's operating system detects a time adjustment, the guest operating system may experience internal timeouts or overloads, with a consequent system abort. One aspect of the system 100, and corresponding method, involves making time adjustments at processing transition points when the operating system cannot, or is architecturally structured not to notice the time adjustments. An exemplary adjustment sequence is shown in FIG. 4. Curve 1 of FIG. 4 shows the physical ITC value ($ITC_O$) for the OPM increasing. At t1, the applications associated with the virtual machine 20 are frozen and the virtual machine 20 migrates to a TPM. At t2, the applications are thawed, and the virtual machine 20 now sees the wall-clock value computed using the virtual ITC value created by the system 100. The virtual ITC value follows curve 2 as shown. The system 100 makes periodic adjustments to the virtual ITC value (moves time forward) at transition points where such adjustments will not be noted by the virtual machine's operating system. At point t3, the virtual ITC value again equals the ITC value of the OPM. The amount of each adjustment is determined by noting the normal transition time and computing the adjustment as a fraction (e.g., one half) of that transition time.

Note also that during Phase 1, the time adjustments are forward, never backward. The reason for this forward-only time adjustment is that time moving backwards is not the architectural behavior of the physical hardware, which is guaranteed to be monotonically increasing. For example, when a physical machine is being tested for time outs, time T0 is read at the beginning of a time out, and time T1 is read at the end. If time were to move backward, then T1 would be lower than T0, and the duration between T1 and T0, being typically computed by subtracting T0 from T1 using unsigned binary arithmetic, would be very large. Such very large values are likely to be interpreted by guest software as indicative of a timeout, causing a software error or a system abort.

If the processor frequencies of the OPM and the TPM are the same, the virtual ITC value of the virtual machine 20 after the offset has been reduced to zero should track that of the OPM. If the operating frequencies differ, the scaling factor (SF) will be other than approximately 1 (one), and virtualization of the ITC remains indispensable even if the offset is zero. In that case, running Phase 2 is not desirable, since it causes the wall-clock time as observed by the guest to diverge from the ideal wall-clock time. Thus, in an embodiment, Phase 2 is not attempted when the scaling factor is greater or smaller than 1.0 by more than a few percents (e.g., 1.00 plus or minus 0.001—the exact amount being configurable).

Figure 5:
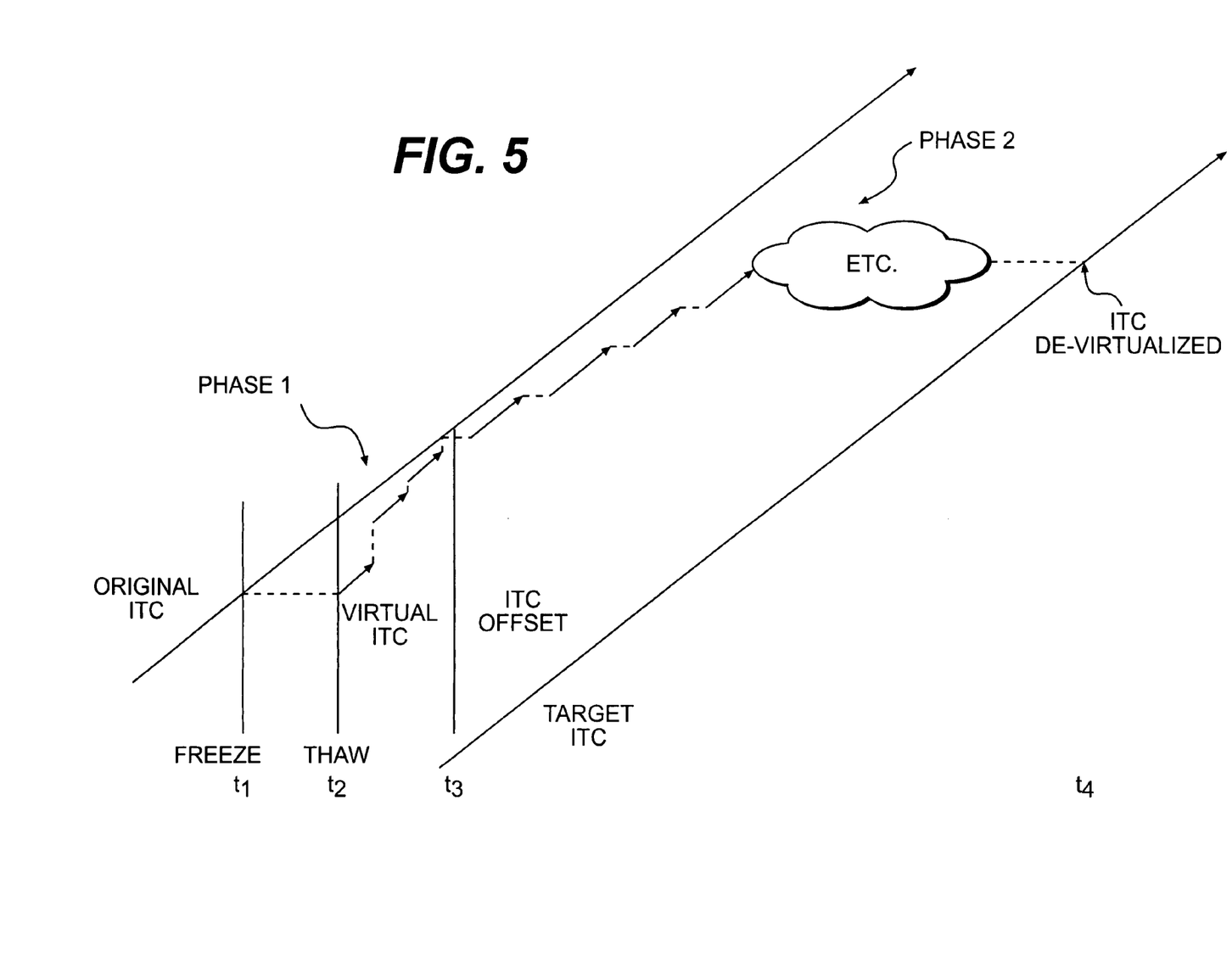
FIG. 5 is a time chart illustrating an exemplary de-virtualization operation using the system of FIG. 2.

As noted above, because the TPM and the OPM may not have the same power-up time, even after the Phase 1 adjustment, the virtual machine 20 may be operating with a non-zero offset in order for the wall-clock time to match the ideal wall-time. If this offset is small enough, this time origin differential may be eliminated, thereby reducing the virtualization penalty, by a process similar to that of reducing (zeroing) the missing time portion of the offset. That is, at certain transition points where the operating system and the applications cannot be guaranteed that time before the transition will be consistent with time after the transition, the system 100 may adjust the virtual ITC value so that it eventually will match the ITC value of the TPM. This adjustment scenario is illustrated in FIG. 5. Phase 1 of the time adjustment (t1-t3) removes the missing time component of the offset. Phase 2 of the time adjustment (t3-t4) results in de-virtualization of the virtual ITC. Note that the Phase 2 adjustments to the virtual ITC may be forward (as in Phase 1) or backward (which cannot happen in Phase 1). However, the adjustments cause the real-time clock value to diverge from wall-clock time. This divergence then can be corrected by other software routines installed on the virtual machine, such as network time protocols. Furthermore, the time adjustments in Phase 2 must be smaller, or occur at a slower rate, than in Phase 1 because the other software routine in the virtual machine may otherwise refuse to compensate for the time drift introduced by Phase 2.

When multiple processors (CPUs) are present in the computer system and may be involved in time-disrupting events such as virtual machine migration, the time correcting adjustments may require additional steps. Specifically, when the offset (O) is adjusted on one virtual CPU, it must be adjusted so as to limit the offset difference between the virtual CPUs to what is acceptable to the guest software. In one particular embodiment where the offset is adjusted on virtual interrupts, offset adjustments are unlikely to happen at the same time or at the same rate on all virtual CPUs. If one CPU is adjusted and the remaining CPUs are not, a time difference develops among the CPUs, making them out of synch. For example, assume a first CPU is adjusted by 5 ms and a second has no adjustment. When guest software reads the ITC register on the first virtual CPU and then on the second, there may be a 5 ms error between the two values being returned, even if the ITC register accesses are performed simultaneously. Thus, to prevent too large a time differential between virtual CPUs, the system 100 makes time adjustments to each of the multiple CPUs that take into account the offset on other virtual CPUs. For example, during a transition point on a virtual CPU, the offset may be computed so that wall-time on this virtual CPU is not too far ahead of any other virtual CPU. At a transition point, the system 100 computes the amount of time to move the CPU forward. If the resulting virtual time is too far ahead of another virtual CPU, then the adjustment is deferred until a later transition point when that other virtual CPU will have reached its own transition point and moved its own time forward. This additional time adjustment step helps minimize the time differential among the CPUs.

Figure 6A:
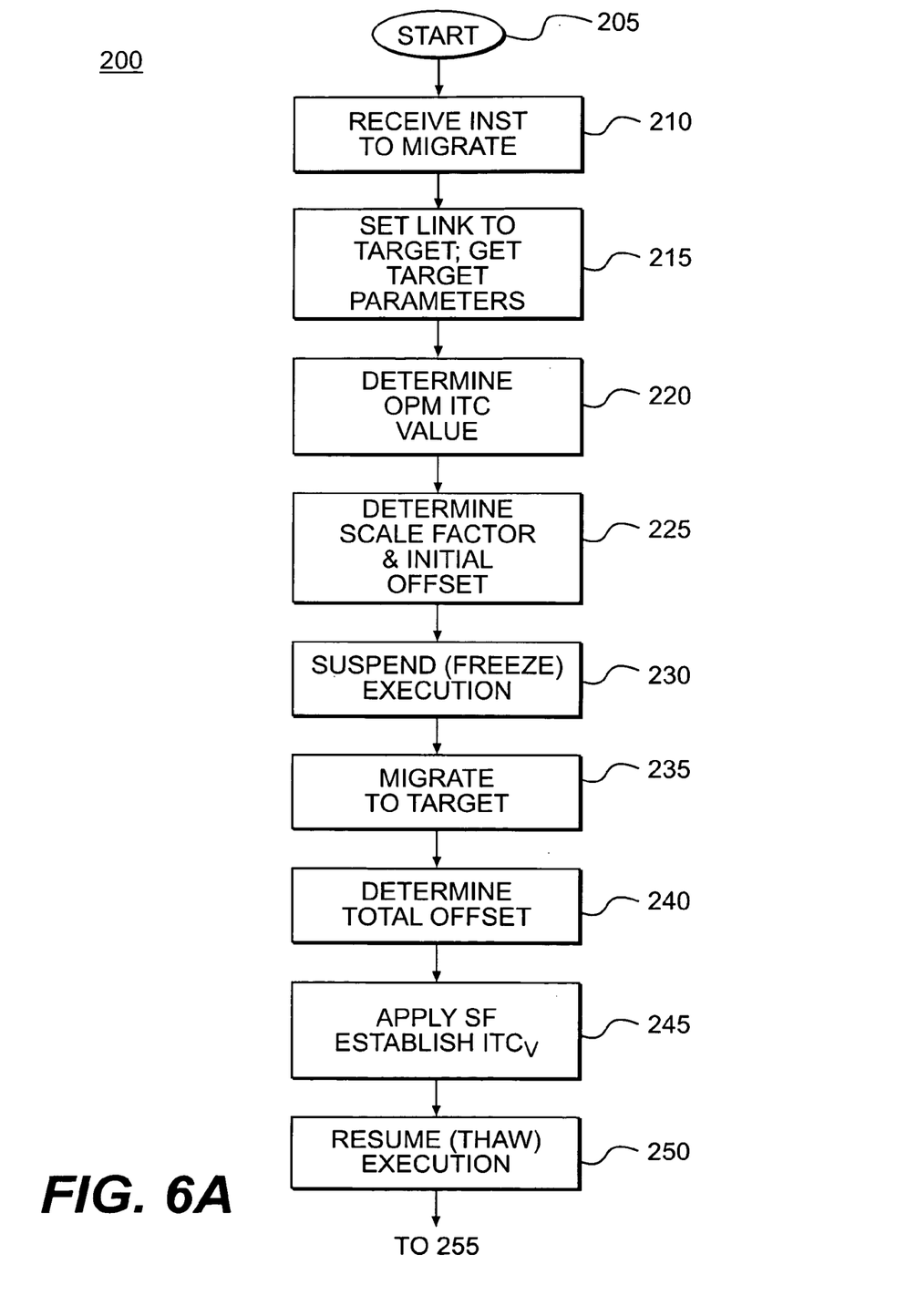
FIGS. 6A and 6B are flow charts illustrating exemplary operations of the system of FIG. 2.
Figure 6B:
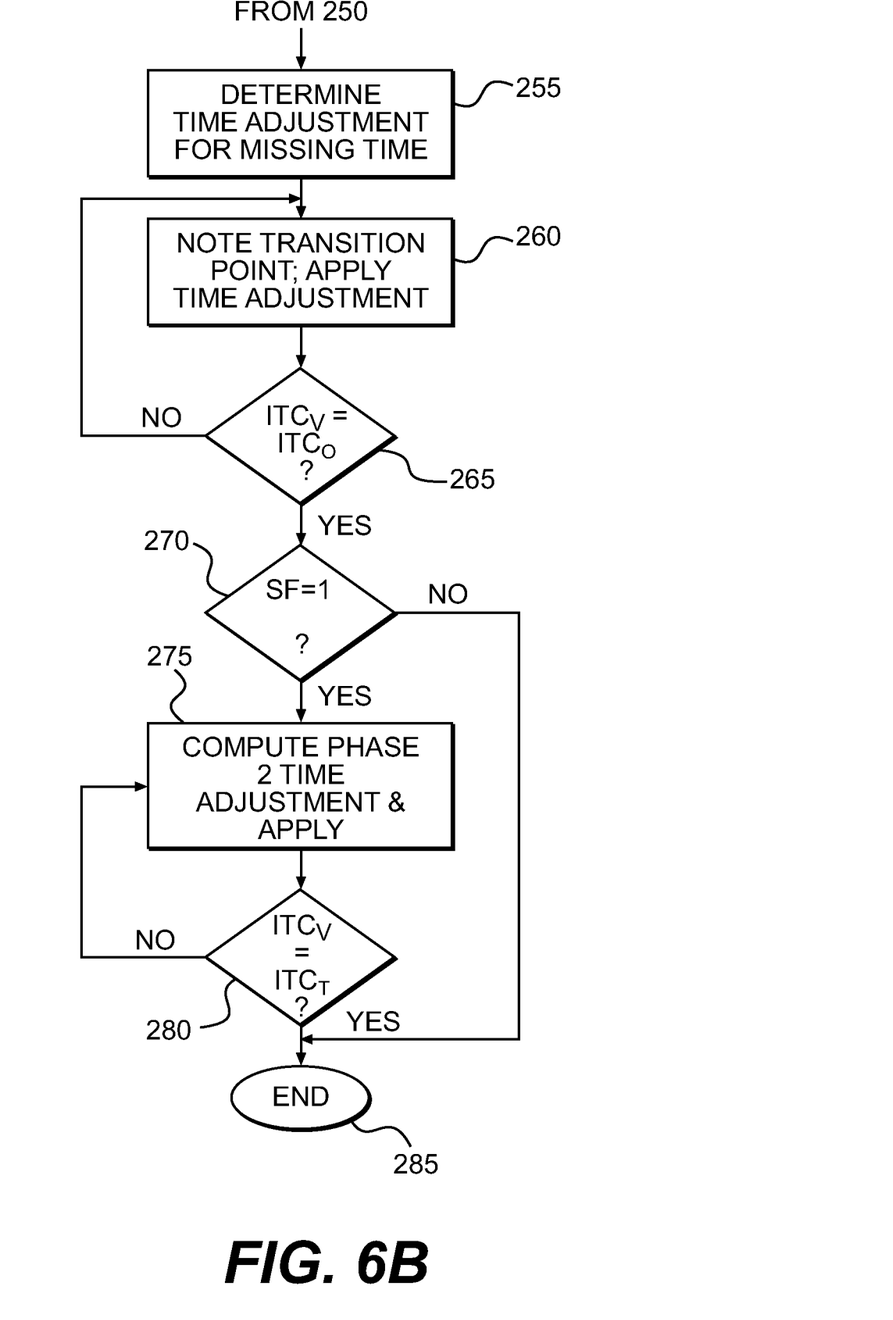

FIGS. 6A and 6B are flowcharts illustrating an exemplary time adjustment operation 200 executed under the control of the system 100 of FIG. 2. The operation 200 beings in block 205 with a computer system in operation and executing one or more virtual machines on two or more physical machines. In block 210, virtual machine monitor 160 of virtual machine 20 receives an instruction to migrate from an original physical machine 50 to a target physical machine. In block 215, the monitor 160 initiates a link to the target physical machine to exchange information and data needed to complete the migration, and then sends virtual machine information to the target physical machine, and receives, in return, target physical machine data.

In block 220, the system 100 determines an ITC value of the original physical machine 50. In block 225, the offset module 110 and scaling module 120 determine, respectively, the initial values of offset and scaling factor. In block 230, the virtual monitor 160 suspends (freezes) execution of the virtual machine 20. In block 235, the virtual monitor causes the virtual machine 20 to migrate to the target physical machine.

In block 240, the target's virtual machine monitor determines the total offset value, being the sum of the time origin differential and the initial offset plus missing time allocated to the actual migration operation during which the virtual machine execution was suspended. In block 245, the target's virtual machine monitor applies the scaling factor to the physical ITC of the target physical machine 50 to establish the $ITC_V$ value. In block 250, the virtual machine execution is resumed (thawed) on the target physical machine.

In block 255, Phase 1 of the time adjustments begins with the system 100 determining the appropriate time adjustment increment (i.e., milliseconds) to account for the missing time. In block 260, the system 100 notes the occurrence of a processing transition point at which an application or the operating system of the virtual machine 20 would not notice a time break, and applies the time adjustment computed in block 255 to the $ITC_V$. In block 265, the system 100 determines if the now-adjusted $ITC_V$ value equals the $ITC_O$ value of the original physical machine (see FIG. 4). If the two values are not equal, the operation 200 returns to block 260, and additional time adjustments are made to the $ITC_V$. If the two values are equal, the operation 200 moves to block 270.

In block 270, the system 100 determines if the scaling factor is approximately equal to one (1.0). If the scaling factor is not approximately equal to one (1.0), the operation 200 moves to block 285. Otherwise, the operation 200 moves to block 275. In block 275, Phase 2 of the time adjustments begins so as to de-virtualize the $ITC_V$ by computing time adjustments to move the $ITC_V$ equal to the physical ITC of the target physical machine ($ITC_T$), and applying the time adjustments at appropriate processing transition points. In block 280, the system 100 determines if the $ITC_V$ value equals the $ITC_T$ value. If the two values are not equal, the operation 200 returns to block 275. If the two values are equal, the operation 200 moves to block 285 and ends with the virtual machine 20 executing on the target physical machine and the ITC de-virtualized.

The invention claimed is:

1. A system for virtualizing a real-time clock in the presence of a time-disrupting event, the real-time clock used with a plurality of physical machines, the system implemented in one or more programmable devices, the physical machines hosting one or more virtual machines, the system comprising:
    an offset module to determine a time difference offset between a virtual interval timer counter (ITCv) associated with a virtual machine and a physical interval timer counter (ITCp) associated with a physical machine, wherein the time difference offset is caused by the time-disrupting event; and
    a virtual machine monitor to compute first time adjustments based on the offset and apply the first time adjustments at respective points to eliminate at least a first part of the offset, wherein the applying of the first time adjustments at the respective points cause incremental adjustments of the ITCv.

2. The system of claim 1, further comprising a de-virtualizing monitor to compute and apply one or more second time adjustments to eliminate a second part of the time difference offset.

3. The system of claim 1, further comprising:
a scaling module to compute a ratio of an original physical machine operating frequency and a target physical machine operating frequency, wherein the virtual machine monitor is to apply the scaling factor to the ITCv.

4. The system of claim 1, wherein the time-disrupting event includes a migration of the virtual machine to one or more target physical machines.

5. The system of claim 1, wherein each of the first time adjustments comprise a configurable fraction of a time interval.

6. The system of claim 4, wherein the system is installed on a computer architecture comprising multiple processors on one or more of the physical machines, each of the processors comprising an ITC, and wherein the first time adjustments are made such that values of the ITCs of the processors remain within a pre-specified range.

7. The system of claim 1, wherein the first part of the time difference offset comprises a missing time component, wherein the missing time component comprises an approximation of a duration of the time-disrupting event.

8. The system of claim 2, wherein the second part of the time difference offset comprises a time origin differential comprising a difference in power-up time between two physical machines on which the virtual machine may execute.

9. The system of claim 7, wherein the missing time component includes time that virtual machine processing is suspended during the time-disrupting event.

10. The system of claim 1, wherein the virtual machine monitor is to continue applying the first time adjustments until the ITCv equals the ITCp.

11. The system of claim 1, wherein the incremental adjustments of the ITCv are to avoid interrupting an operation of a guest operating system in the virtual machine that is subjected to the time-disrupting event.

12. A method, executed by one or more processors, for compensating for a time-disrupting event occurring in a computer system comprising multiple physical machines, the method comprising:
receiving, at an original physical machine (OPM), an indication of the time-disrupting event;
determining a physical interval timer counter (ITCO) value of the OPM;
determining a virtual interval timer counter (ITCV) value of a virtual machine (VM) executing on the OPM, wherein after completion of the time-disrupting event, the ITCV value and the ITCO value diverge; and
applying first time adjustments at corresponding transition points to incrementally adjust the ITCV value at respective points, where the first time adjustments cause the ITCV value and the ITCO value to converge to compensate for divergence of the ITCV value and ITCO value caused by the time-disrupting event.

13. The method of claim 12, wherein the time-disrupting event includes a migration of the VM from the OPM to a target physical machine (TPM).

14. The method of claim 13, further comprising computing and applying a scaling factor, defined as a ratio of a frequency of the OPM and a frequency of the TPM, to the ITCV value.

15. The method of claim 14, further comprising suspending operation of the VM during at least a portion of the time-disrupting event.

16. The method of claim 14, further comprising:
determining a physical ITC value (ITCT) of the TPM; and
computing and applying a second time adjustment value that causes the ITCV and the ITCT to converge, wherein the second time adjustment value is applied at additional selected operating transition points.

17. The method of claim 16, wherein the transition points and the additional transition points comprise processing events during execution of the VM at which the VM cannot be guaranteed time consistency before and after the processing events.

18. The method of claim 12, wherein applying the first time adjustments continues until the ITCV value is equal to the ITCO value.

19. The method of claim 12, wherein the incremental adjustments of the ITCV value are to avoid interrupting an operation of a guest operating system in the VM that is subjected to the time-disrupting event.

20. The method of claim 12, wherein a time difference offset corresponding to the divergence includes a first part and a second part, wherein applying the first time adjustments eliminates the first part of the time difference offset, the method further comprising:
applying second time adjustments to eliminate the second part of the time difference offset, wherein the first part of the time difference offset comprises a missing time component, the missing time component including a time that virtual machine processing is suspended during the time-disrupting event, and wherein the second part of the time difference offset comprises a time origin differential comprising a difference in power-up time between two physical machines on which the virtual machine may execute.

21. A system that compensates for a time-disrupting event occurring in a computer system, the computer system comprising multiple physical machines, the system comprising:
one or more processors;
an offset module to determine a time difference offset between a virtual interval timer counter (ITCV) associated with a virtual machine and a physical interval timer counter (ITCP) associated with a physical machine, wherein the time difference offset is caused by the time-disrupting event;
a virtual machine monitor to apply first time adjustments based on the time difference offset, where the first time adjustments are to be applied at respective transition points to incrementally adjust the ITCV to eliminate at least a first part of the time difference offset;
a scaling module to compute a ratio of an original physical processor machine operating frequency and a target physical processor machine operating frequency, wherein the virtual machine monitor is to apply the scaling factor to the ITCV; and
a de-virtualizing monitor to apply one or more second time adjustments to eliminate a second part of the time difference offset.

22. The system of claim 21, wherein the time-disrupting event includes a migration of the virtual machine to one or more target physical machines, wherein the first time adjustments comprise a configurable fraction of a time interval.

23. The system of claim 21, wherein the first part of the time difference offset comprises a missing time component, the missing time component including a time that virtual machine processing is suspended during the time-disrupting event, and wherein the second part of the time difference offset comprises a time origin differential comprising a difference in power-up time between two physical machines on which the virtual machine may execute.

24. The system of claim 21, wherein the virtual machine monitor is to continue applying the first time adjustments until the ITCV equals to the ITCP.

25. The system of claim 21, wherein the incremental adjustments of the ITCV are to avoid interrupting an operation of a guest operating system in the virtual machine that is subjected to the time-disrupting event.

* * * * *

UNITED STATES PATENT AND TRADEMARK OFFICE
CERTIFICATE OF CORRECTION

PATENT NO.        : 8,694,819 B2                           Page 1 of 1
APPLICATION NO.   : 12/461774
DATED             : April 8, 2014
INVENTOR(S)       : Christophe De Dinechin et al.

It is certified that error appears in the above-identified patent and that said Letters Patent is hereby corrected as shown below:

In the Claims

In column 11, line 17, in Claim 6, delete "claim 4," and insert -- claim 5, --, therefor.

Signed and Sealed this
Second Day of September, 2014

Michelle K. Lee
*Deputy Director of the United States Patent and Trademark Office*